(12) United States Patent
Furusawa et al.

(10) Patent No.: US 10,893,592 B2
(45) Date of Patent: Jan. 12, 2021

(54) IMAGE FORMING DEVICE

(71) Applicant: SHARP KABUSHIKI KAISHA, Sakai (JP)

(72) Inventors: Masayuki Furusawa, Sakai (JP); Kazushi Yamaneki, Sakai (JP); Kenta Konishi, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/601,135

(22) Filed: Oct. 14, 2019

(65) Prior Publication Data

US 2020/0128641 A1   Apr. 23, 2020

(30) Foreign Application Priority Data

Oct. 17, 2018 (JP) ................................ 2018-195955

(51) Int. Cl.
*H05B 47/10* (2020.01)
*G02F 1/13357* (2006.01)
*H04N 1/00* (2006.01)

(52) U.S. Cl.
CPC ....... *H05B 47/10* (2020.01); *G02F 1/133602* (2013.01); *H04N 1/00129* (2013.01)

(58) Field of Classification Search
CPC .......... G02F 1/133602; H04N 5/23293; H04N 13/239; H04N 13/243; H04N 13/344; H04N 5/2354; H04N 5/445; H04N 9/3194; H04N 13/296; H04N 21/4223; H04N 13/254; H04N 13/383; H04N 1/00129; H04N 1/02835; H04N 1/0284; H04N 1/0288; H04N 1/1135; H04N 21/431; H04N 5/232; H04N 5/23216; H04N 5/23219; H04N 5/23238; H04N 5/23245; H04N 5/23296;
(Continued)

(56) References Cited

U.S. PATENT DOCUMENTS 10,699,552 B2*  6/2020  Shimizu ............... G06F 3/0425
2005/0265014 A1* 12/2005  Matsui ................ H04N 5/2256
                                                362/5
(Continued)

FOREIGN PATENT DOCUMENTS

JP   2008-233482 A   10/2008

*Primary Examiner* — Negussie Worku
(74) *Attorney, Agent, or Firm* — ScienBiziP, P.C.

(57) ABSTRACT

An image forming device includes a light emission controller that controls emission of a plurality of types of light emission patterns from a plurality of light sources. The light emission controller emits respective light emission patterns corresponding to the operation. When among the plurality of types of light emission patterns, the preceding light emission pattern overlaps with the subsequent light emission pattern, the light emission controller preferentially emits the subsequent light emission pattern having a delay in the light emission start timing. The light emission controller also emits respective first light emission patterns corresponding to the operation, and emits the second light emission pattern expressing the predetermined operation. When any type of emission of the first light emission pattern among the plurality of types of first light emission patterns overlaps with emission of the second light emission pattern, the light emission controller preferentially emits the second light emission pattern.

7 Claims, 14 Drawing Sheets

(58) Field of Classification Search
CPC .......... H04N 5/2628; H04N 5/33; H04N 5/45;
H04N 7/18; H04N 7/181; H04N 7/185;
H04N 9/31; H04N 9/3185; H04N 13/15;
H04N 13/161; H04N 13/204; H04N
13/207; H04N 13/332; H04N 17/002;
H04N 1/00; H04N 1/00074; H04N
1/00076; H04N 1/0035; H04N 1/00381;
H04N 1/00384; H04N 1/00405; H04N
1/00411; H04N 1/00474; H04N 1/0049;
H04N 1/00798; H04N 1/00816; H04N
1/00819; H04N 1/00997; H04N 1/02463;
H04N 1/02865; H05B 47/10
USPC .................................. 399/370; 358/509, 475
See application file for complete search history.

(56) References Cited

U.S. PATENT DOCUMENTS

| | | | | |
|---|---|---|---|---|
| 2009/0262553 | A1* | 10/2009 | Kim | G02B 3/0006 |
| | | | | 362/619 |
| 2011/0128576 | A1* | 6/2011 | Tashiro | G03G 15/043 |
| | | | | 358/1.15 |
| 2013/0278866 | A1* | 10/2013 | Tsumura | F21V 13/04 |
| | | | | 349/67 |
| 2016/0295070 | A1* | 10/2016 | Nakazawa | H04N 1/0281 |
| 2016/0360125 | A1* | 12/2016 | Yamamoto | A61B 1/05 |
| 2018/0091691 | A1* | 3/2018 | Kida | H04N 1/0306 |
| 2018/0160003 | A1* | 6/2018 | Sutoh | G02B 6/0051 |
| 2018/0213097 | A1* | 7/2018 | Seike | H04N 1/0049 |
| 2018/0359383 | A1* | 12/2018 | Tada | G06K 9/4604 |
| 2019/0259181 | A1* | 8/2019 | Ishikawa | G06F 16/5846 |
| 2020/0128137 | A1* | 4/2020 | Furusawa | H04N 1/00496 |
| 2020/0285436 | A1* | 9/2020 | Saita | G06F 21/35 |

\* cited by examiner

IMAGE FORMING DEVICE

BACKGROUND OF THE INVENTION

Field of the Invention

The present invention relates to an image forming device such as copying machines, multi-function peripherals, facsimile machines, and printers, and relates in particular to an image forming device that controls light emissions of a plurality of types of light emission patterns from a plurality of light sources.

Description of the Background Art

Image forming devices that control light emission of a plurality of types of light emission patterns from a plurality of light sources are conventionally known (for example, Japanese Unexamined Patent Application Publication No. 2008-233482).

More specifically, Japanese Unexamined Patent Application Publication No. 2008-233482 discloses a light emission pattern (lighting pattern) that is utilized for displaying the status and the job progress status of the image forming device (paragraph [0046]); specifically a light emission pattern for ready status of the image forming device, a light emission pattern for error status of the image forming device, a light emission pattern for image forming status of the image forming device, and a light emission pattern for facsimile receive status of the image forming device are disclosed (paragraphs [0077]-[0082]).

However, an image forming device capable of visually expressing the operation by the operator at the operating portion to the operator is needed. However, the image forming device disclosed in Japanese Unexamined Patent Application Publication No. 2008-233482 does not control light emission of light emission patterns for the operation by the operator at the operating portion.

Thereupon an object of the present invention is to provide an image forming device capable of visually expressing the operation by the operator at the operating portion to the operator.

SUMMARY OF THE INVENTION

To resolve the aforementioned issues, the present invention provides an image forming device of a first aspect and a second aspect described below.

(1) The Image Forming Device of a First Aspect

The image forming device of a first aspect of the present invention includes a light emission controller that controls emission of a plurality of types of light emission patterns from a plurality of light sources. The light emission controller emits respective light emission patterns corresponding to a plurality of types of operation by an operator at an operating portion. When emission of a preceding light emission pattern corresponding to the preceding operation among the plurality of types of light emission patterns overlaps with emission of a subsequent light emission pattern corresponding to an operation subsequent to the preceding operation, the light emission controller preferentially emits the subsequent light emission pattern having a delayed light emission start timing.

(2) The Image Forming Device of a Second Aspect

The image forming device of a second aspect of the present invention includes a light emission controller that controls emission of a plurality of types of light emission patterns from a plurality of light sources. The light emission controller emits respective first light emission patterns corresponding to a plurality of types of operation by an operator at an operating portion and also emits a second light emission pattern expressing a predetermined operation of the light forming device. When emission of any type of the first light emission pattern among the plurality of first light emission patterns overlaps with emission of the second light emission pattern, the light emission controller preferentially emits the second light emission pattern.

The present invention allows visually expressing to the operator regarding the operation by the operator at the operating portion.

DESCRIPTION OF THE PREFERRED EMBODIMENTS

Figure 1:
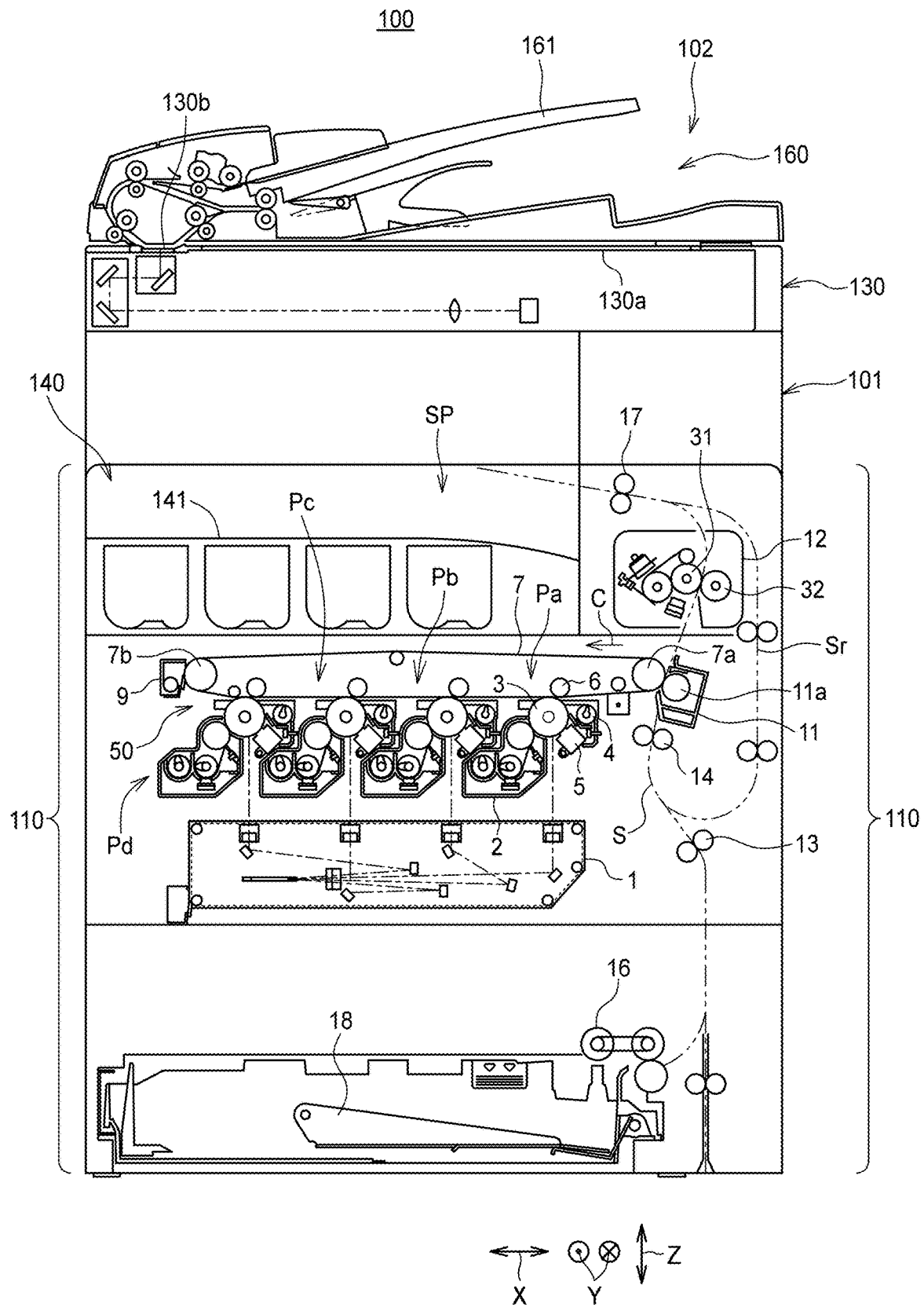
FIG. 1 is a transparent frontal view showing the overall structure of an image forming device of the embodiment of the present invention.

The embodiments of the present invention are hereinafter described while referring to the accompanying drawings. In the following description, the same reference numerals are assigned to the same parts, and their names and functions are the same. A repetitive detailed description is therefore omitted.

Figure 2:
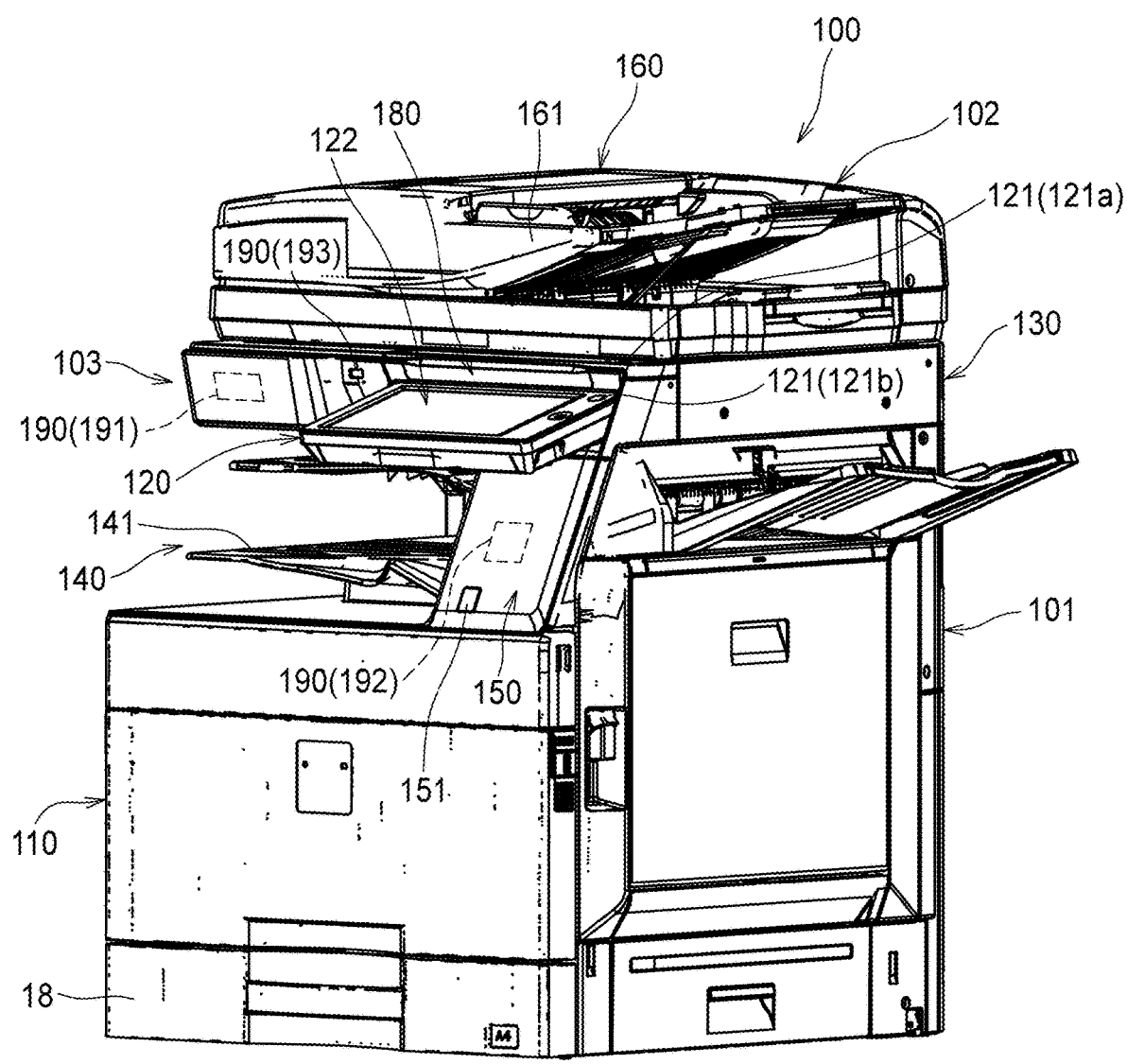
FIG. 2 is a perspective viewing showing the outer appearance of one example of the image forming device of the embodiment.
Figure 3:
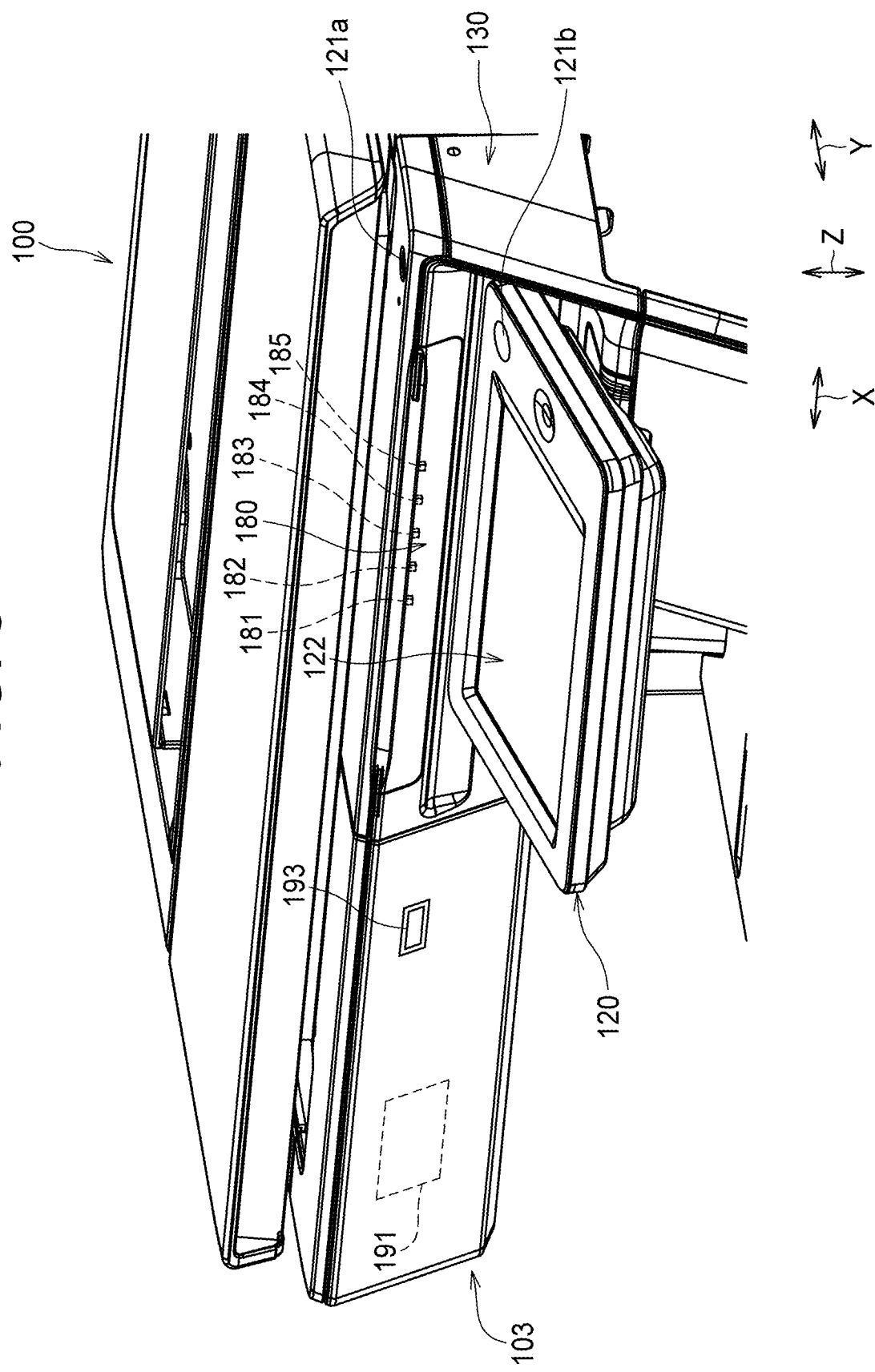
FIG. 3 is a perspective view showing part of a pattern light emission portion of the image forming device shown in FIG. 1.
Figure 4:
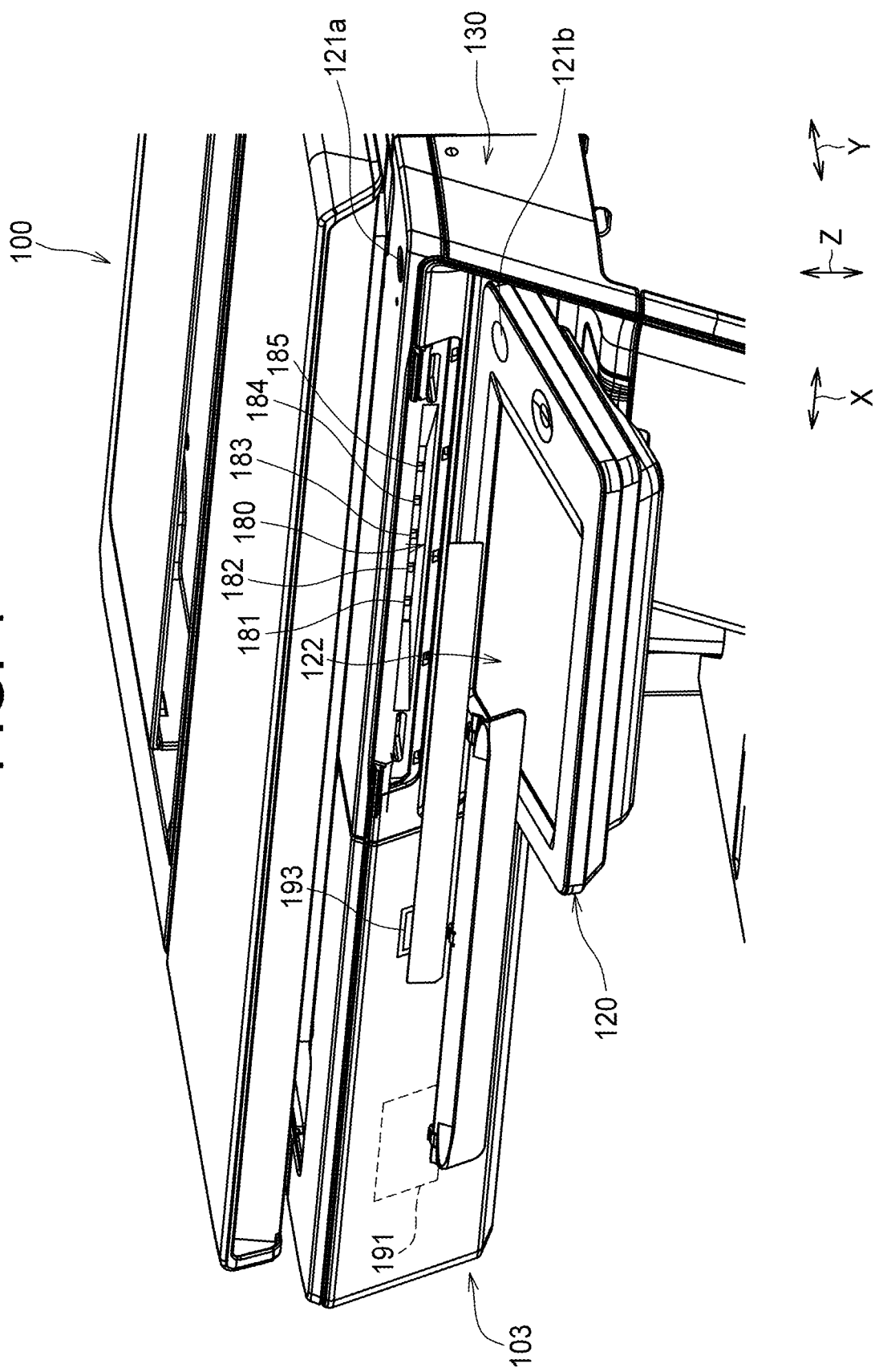
FIG. 4 is an exploded perspective view showing part of the pattern light emission portion of the image forming device shown in FIG. 1.
Figure 5:
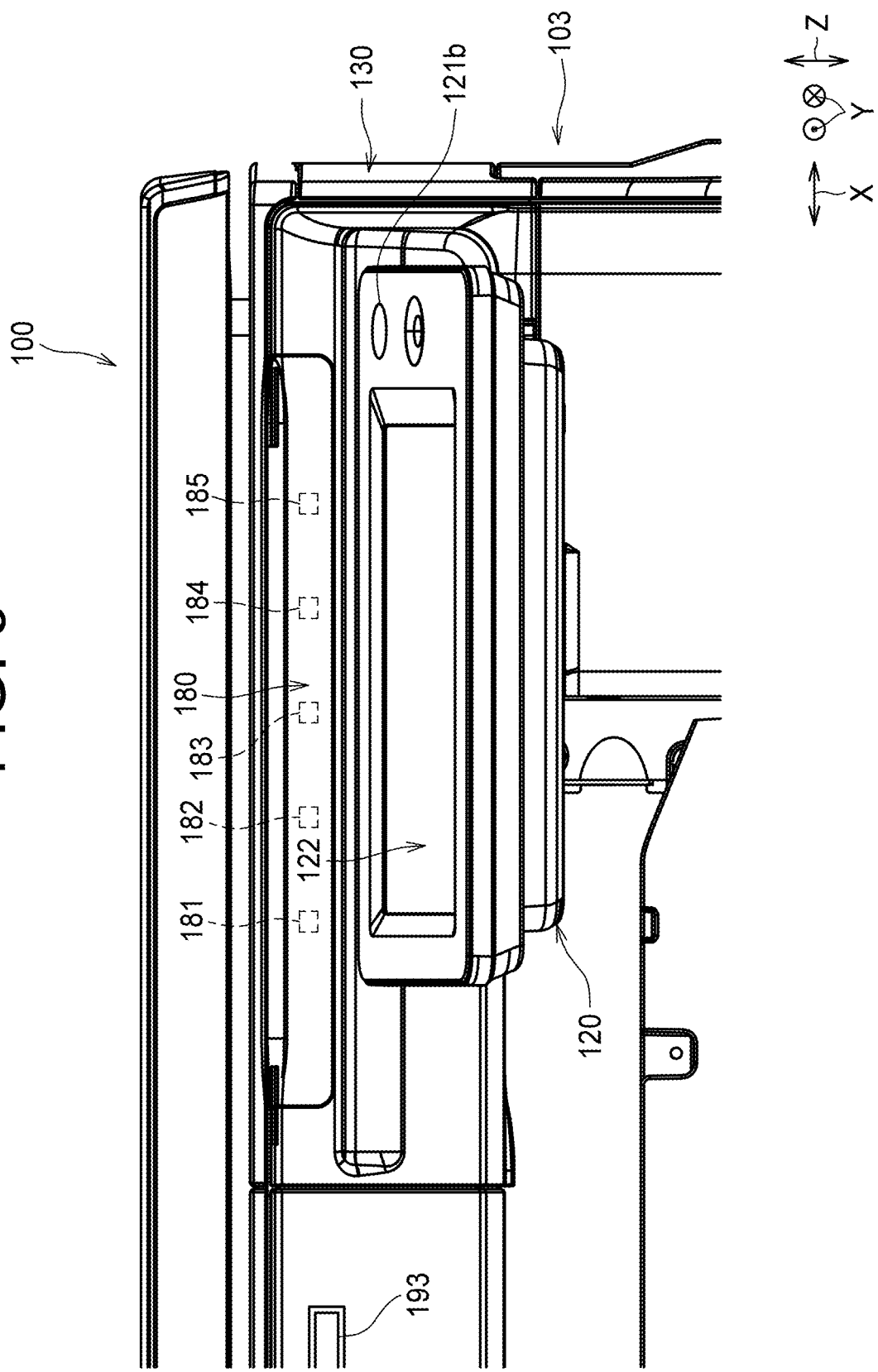
FIG. 5 is a frontal view showing part of the pattern light emission portion of the image forming device shown in FIG. 1.

FIG. 1 is a transparent frontal view showing the overall structure of the image forming device 100 of the embodiments of the present invention. FIG. 2 is a perspective view showing the outer appearance of one example of the image forming device 100 of the embodiments. FIG. 3 and FIG. 4 are respectively a perspective view and an exploded perspective view showing the pattern light emission portion 180 of the image forming device 100 shown in FIG. 1. FIG. 5 is a frontal view showing a portion of the pattern light emission portion 180 of the image forming device 100 shown in FIG. 1.

Figure 6:
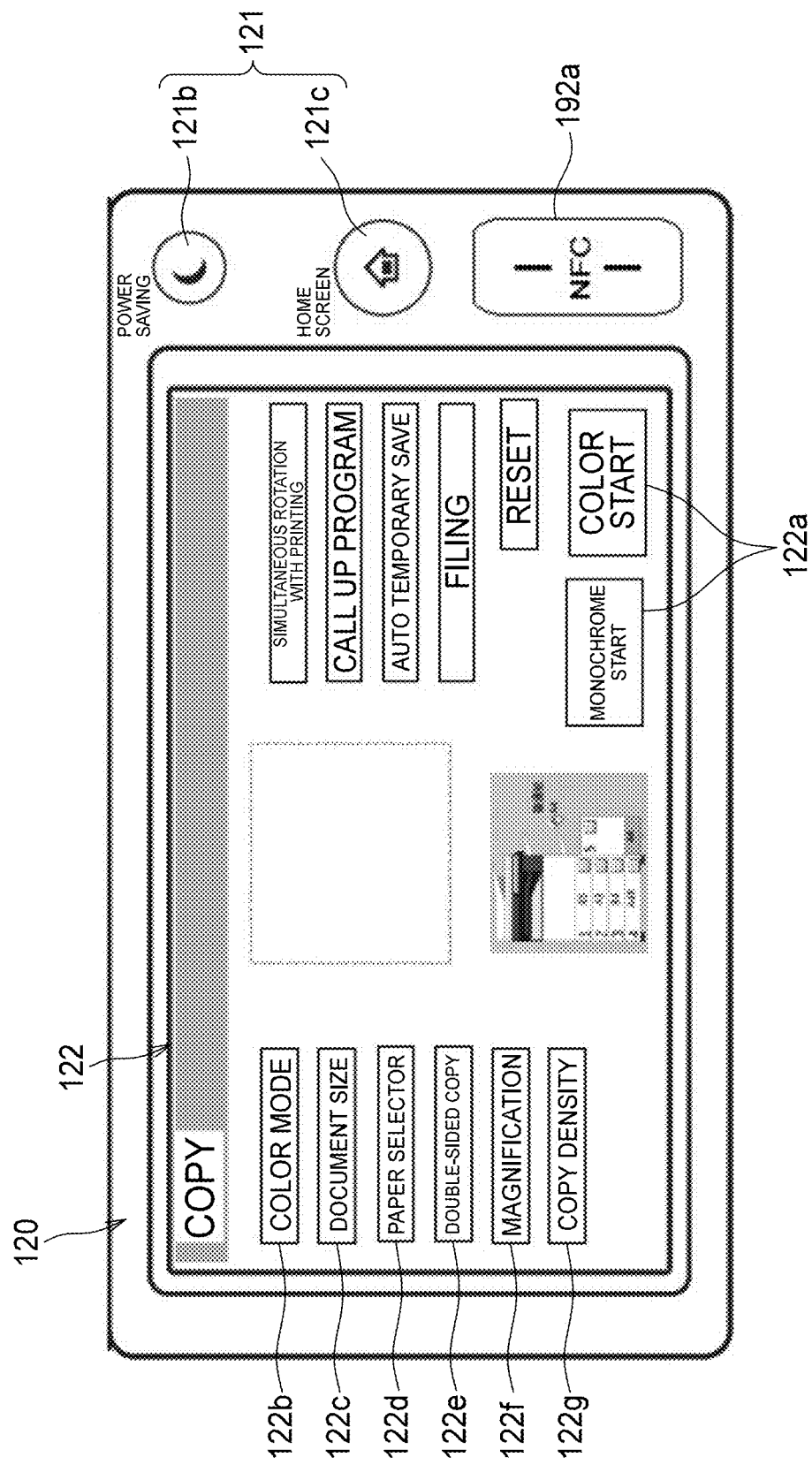
FIG. 6 is a plan view showing an operating device in the image forming device shown in FIG. 1.
Figure 7:
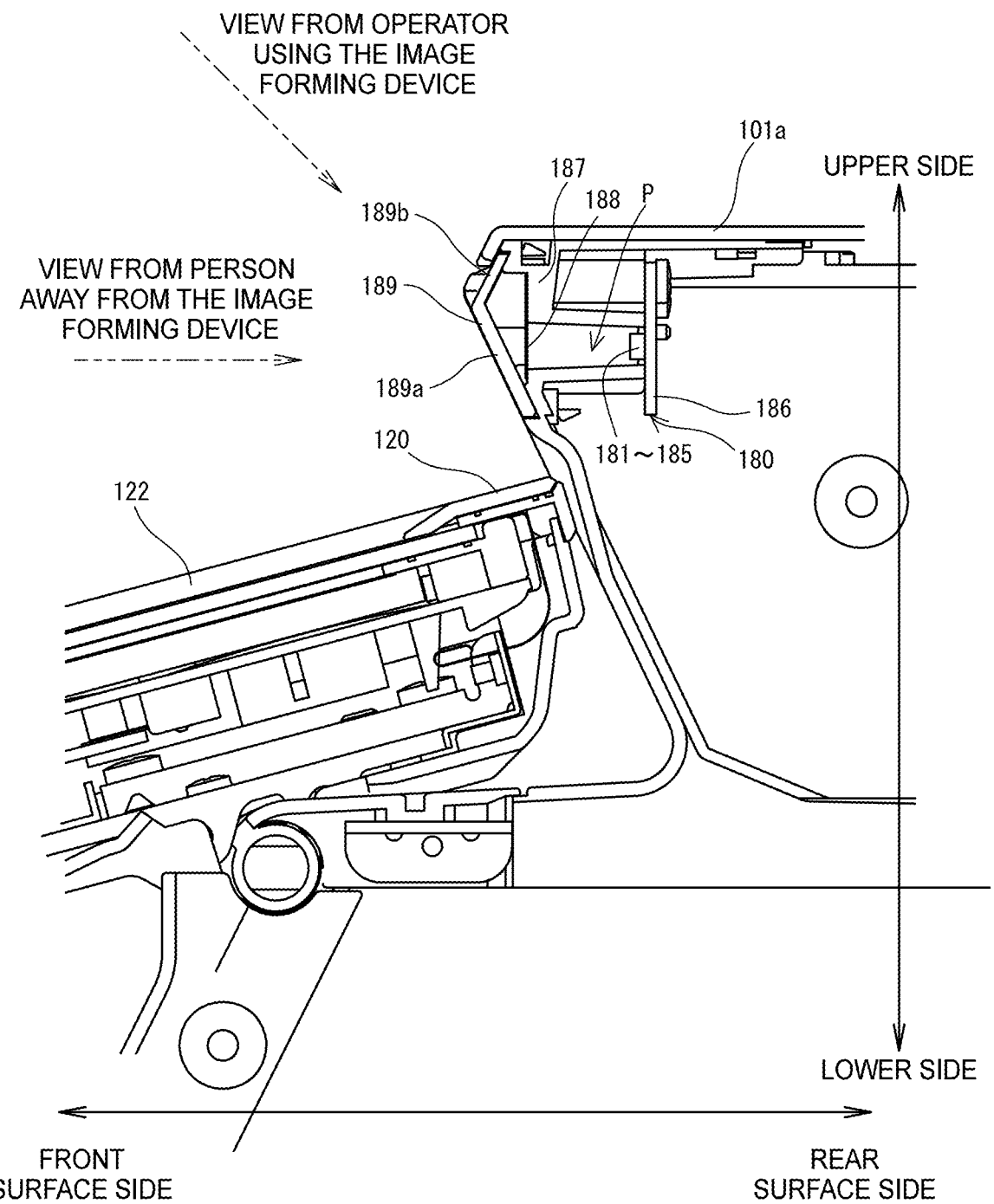
FIG. 7 is an overall cross-sectional view seen from a side surface of the peripheral area of the pattern light emission portion.
Figure 8:
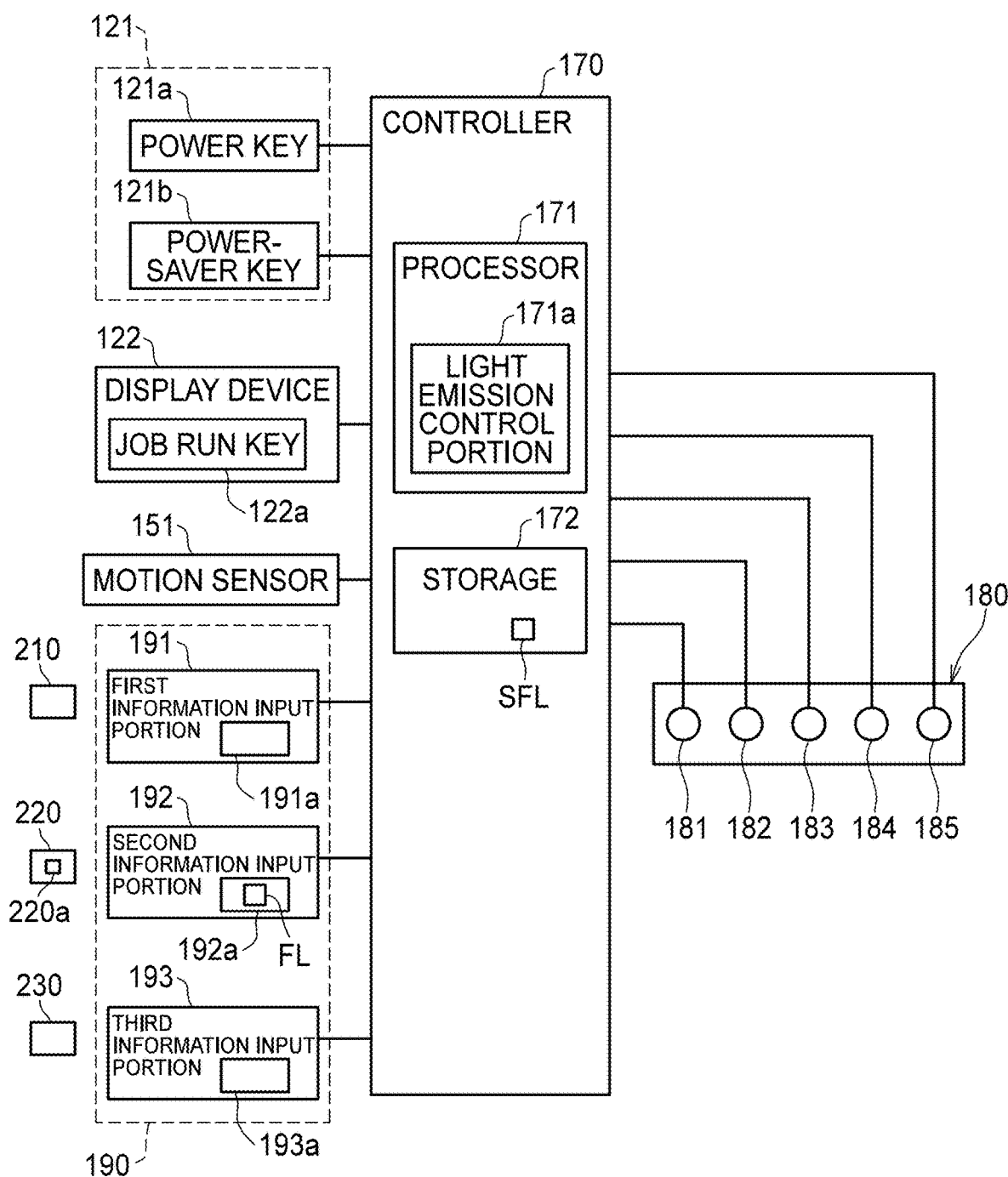
FIG. 8 is a system block diagram of a control system in the image forming device shown in FIG. 1.

FIG. 6 is a plan view showing a control panel 120 of the image forming device 100 shown in FIG. 1. FIG. 7 is an overall cross-sectional view seen from a side surface of the peripheral area of the pattern light emission portion 180. FIG. 8 is a system block diagram of a control system for the image forming device 100 shown in FIG. 1. In FIGS. 1 to 5, the reference numeral X denotes the left-right direction, and the reference numeral Y denotes the front-rear direction, and the reference numeral Z denotes the up-down direction. In FIGS. 3 to 5, a portion of the drawing for the image scanning device 102 is omitted.

The image forming device 100 is a multi-function peripheral with a copy function, a scanner function, a facsimile function, and a printer function, and externally transmits an image of a document scanned by the image scanning device 102. The image forming device 100 forms an image of a text that is scanned by the image scanning device 102 or an externally received image in color or monochrome on paper (sheet).

An automatic text feeder 160 (an Auto Document Feeder (ADF)) supported to freely open and close relative to the image scanner 130 is mounted above the image scanner 130. In the image forming device 100, when the automatic text feeder 160 is opened, the text placement stand 130a above the image scanner 130 is opened so that the text can be placed by hand. The automatic text feeder 160 conveys the text placed on the paper tray 161 onto the text scanner 130b in the image scanner 130. The image scanner 130 scans the text placed on the text placement stand 130a or the text conveyed by the automatic text feeder 160, and generates image data.

The image forming device 100 includes an optical scanning device 1, a developer device 2, a photosensitive drum 3, a drum cleaning device 4, a charger 5, an intermediate transfer belt 7, a fixing device 12, a paper conveying path S, a paper cassette 18, and an internal paper discharge tray 141.

The image forming device 100 handles image data corresponding to a color image using each of black (K), cyan (C), magenta (M), and yellow (Y) colors, or an image data corresponding to a monochrome image using a single color (for example, black). The image transfer portion 50 in the image forming device 100 contains four developer devices 2 for forming four types of toner images, four photosensitive drums 3, four drum cleaning devices 4, and four chargers 5, and respectively correspond to black, cyan, magenta, and yellow to form the four image stations Pa, Pb, Pc, and Pd.

The optical scanning device 1 exposes the surface of the photosensitive drum 3 to light to form an electrostatic latent image. The developer device 2 develops the electrostatic latent image on the surface of the photosensitive drum 3 and forms a toner image on the surface of the photosensitive drum 3. The drum cleaning device 4 removes and collects residual toner from surface of the photosensitive drum 3. The charger 5 uniformly charges the surface of the photosensitive drum 3 to a predetermined electrical potential. The above-described series of operations form a toner image of each color on the surface of each of the photosensitive drums 3.

An intermediate transfer roller 6 is mounted on the upper side of the photosensitive drum 3 by way of the intermediate transfer belt 7. The intermediate transfer belt 7 is laid a taut state around a transfer drive roller 7a and a transfer follower roller 7b, and moves in the direction of arrow C. In the image forming device 100, the belt cleaning device 9 removes and collects residual toner, sequentially transfers and superimposes toner images of each color formed on the surface of each photosensitive drum 3, and forms a color toner image on the surface of the intermediate transfer belt 7.

A transfer roller 11a of a secondary transfer portion 11 has a nip area formed between the transfer roller 11a and the intermediate transfer belt 7, and holds and conveys the paper through the paper conveying path S in the nip area. When the paper is passing through the nip area, the toner image on the surface of the intermediate transfer belt 7 is transferred and the paper conveyed to the fixing device 12.

The fixing device 12 includes a fixing roller 31 and a pressure roller 32 that rotate while gripping the paper. The fixing device 12 applies heat and pressure to fix the toner image on the paper held between the fixing roller 31 and the pressure roller 32.

The paper cassette 18 is a cassette for accumulating paper used in the image forming and is mounted below the optical scanning device 1. A paper pickup roller 16 pulls out a paper (sheet) from the paper cassette 18 and the paper is conveyed to the paper conveying path S. The paper fed to the paper conveying path S is conveyed to a paper discharge roller 17 by way of the secondary transfer portion 11 and the fixing device 12, and is ejected into the internal paper discharge tray 141. A conveyance roller 13, a resist roller 14, and the paper discharge roller 17 are mounted along the paper conveying path S. The conveyance roller 13 assists in conveying the paper. The resist roller 14 temporarily stops the paper and arrays the leading edge of the paper. The resist roller 14 conveys the temporarily stopped paper at a timing that matches the color toner image timing on the intermediate transfer belt 7. The color toner image on the intermediate transfer belt 7 is transferred onto the paper in the nip area between the intermediate transfer belt 7 and the transfer roller 11a.

In FIG. 1, the number of paper cassettes 18 is one. However, the present invention is not limited to such arrangement and a configuration having a plurality of paper cassettes 18 may be loaded with respectively different types of paper.

When forming images not only on the front surface but also on the back surface of a paper, the image forming device 100 conveys the paper in the opposite direction from the paper discharge roller 17 to the paper inversion path Sr.

The image forming device 100 inverts the front and back of the paper conveyed in the opposite direction and again guides the paper to the resist roller 14. Further, the image forming device 100 forms an image on the back side of the paper in the same way as on the front side of the paper guided to the resist roller 14 and ejects the paper out to the internal paper discharge tray 141.

The image forming device 100 includes an image forming portion 110, an operating device 120 (control panel), an image scanner 130, an ejector 140, a support portion 150, an automatic text feeder 160, and a controller 170. The ejector 140 ejects paper between the image forming portion 110 and the image scanner 130. The support portion 150 supports the image scanner 130 so as to form a space SP between the image forming portion 110 and the image scanner 130.

An image forming device body 101 is an approximately cuboid shape. The image scanner 130 is mounted on the upper surface of the image forming device body 101 and the automatic text feeder 160 is attached on the image scanner 130. The control panel 120 is adjacent to the image scanner 130 and is mounted on the front side of the image scanner 130 that is mounted on the upper surface of the image forming device body 101. Here, the front side is the operating side where the operator operates the control panel 120.

The control panel 120 is mounted at the end in the left-right direction X on the image scanner 130 (specifically, at the right end). The control panel 120 is designed to tilt in the up-down direction Z relative to the image scanner 130.

Various Keys

The control panel 120 includes various keys 121 operated by the operator and a display device 122 (liquid crystal display device). The various keys 121 and the display device 122 are electrically coupled to the controller 170. The various keys 121 (hardware keys) include a power key 121a and a power-saver key 121b. The power key 121a is an on-off key that supplies electrical power to the image forming device 100 in a state where a mechanical main power switch (not shown in drawing) is turned on. More specifically, the power key 121a is an electrical sub-power switch, and when for example the power key 121a is turned off, only designated structural elements such as facsimile by telephone line or internet facsimile will function. The power-saver key 121b is an on-off key for use when the image forming device 100 is in the standby state. When the power-saver key 121b is turned on, the image forming device 100 is set to energy saving mode while in standby. When the power-saver key 121b is turned off, the energy saving mode is canceled.

Also, a job run key 122a (software key) that executes a job (copy job, scan job, facsimile job) is displayed on the display screen of the display device 122 (see FIG. 6) to allow making entries for operation.

On the control panel 120 shown in FIG. 6, the reference numeral 121c denotes a hardware key which is the home screen key for shifting to the home screen (initial screen). The reference numerals 122b to 122g denote software keys, and are respectively a color mode key to select the color mode, a document size key to select the document size, a paper selector key to select the paper size, a double-sided copy key to select copying on both sides, a magnification key to select the magnification, and a copy density key to select the copy (print) density.

Motion Sensor

A motion sensor 151 that detects the presence of a person is mounted in the support portion 150 of the image forming device body 101. The motion sensor 151 is electrically coupled to the controller 170. In the energy saving mode the controller 170 cancels the energy saving mode when the presence of a person is detected by the result from the motion sensor.

Information Input Portion

Further, an information input portion 190 that enters information into the image forming device 100 is mounted in the image forming device body 101. The information input portion 190 is electrically coupled to the controller 170.

More specifically, the information input portion 190 includes a first information input portion 191, a second information input portion 192, and a third information input portion 193. The first information input portion 191 is a non-contact type interface and contains an Integrated Circuit (IC) card reader 191a for reading information recorded on an IC card 210. The IC card 210 for example stores recorded personal authentication information capable of identifying an individual. The second information input portion 192 contains an NFC (registered trademark) tag 192a (see FIG. 6 and FIG. 8). The third information input portion 193 is a connection type interface and contains a USB port 193a for reading information recorded in the USB (registered trademark) memory 230. Here, the NFC tag 192a is an internal part of the image forming device body 101 and, for example, stores wireless Local Area Network (LAN) communication setup information. The NFC tag reader 220a that reads the information recorded in the NFC tag 192a is, for example, an internal element in the NFC portable terminal 220 (typically a portable telephone). The NFC tag reader 220a for the NFC portable terminal 220 reads out information for setting wireless LAN communication that is recorded in the NFC tag 192a of the image forming device body 101 and sets the NFC tag 192a read complete flag FL (inventory complete flag) to ON.

Operating Portion

In the image forming device 100, the operating portion 103 includes the front surface of the image scanner 130, the front surface of the support portion 150, and the control panel 120.

Controller

The controller 170 includes a processor 171 that is a microcomputer such as a CPU and a storage 172 that includes a non-volatile memory such as a Read Only Memory (ROM) and a volatile memory such as a Random Access Memory (RAM). The controller 170 controls the operation of each type of structural element by loading and executing a control program stored beforehand in the ROM in the storage 172, onto the RAM in the storage 172 by the processor 171.

Pattern Light Emission Portion

The pattern light emission portion 180 is mounted above the control panel 120 on the front surface of the image scanner 130. The pattern light emission portion 180 includes a plurality of (in this example: 5) light sources 181 to 185 (in this example, blue color light emitting diodes: LED). The light sources 181 to 185 are arranged in parallel in the left-right direction X so as to emit light to the front side. The plurality of light sources 181 to 185 are electrically coupled to the controller 170. The processor 171 includes a light emission control portion 171a that controls light emission of a plurality of different types of light emission pattern combinations that turn on or turn off the plurality of light sources 181 to 185.

More specifically, the pattern light emission portion 180 is formed in a lateral length extending in the left-right direction, and provided farther inwards than the display device 122, and also within a range including the width of the control panel 120. Namely, the pattern light emission portion 180 is provided so as to face the control panel 120 (display device 122). This placement can also provide the pattern light emission portion 180 directly behind the control panel 120. The pattern light emission portion 180 is also provided above the cavity of the case protrusion 101*a*, shown in FIG. 7.

The pattern light emission portion 180 includes a circuit board 186, an optical path waveguide 187, a light diffusion member 188, and a filter 189. The LEDs that are the light sources 181 to 185 of the pattern light emission portion 180 are provided on the surface on the front side of the circuit board 186. The optical path waveguide 187 forms a light guide path P.

The light diffusion member 188 is a plate-like member, and is provided so as to cover the opening on the front side. The light diffusion member 188 is located more towards the filter 189 side than an intermediate point between the light sources 181 to 185 and the filter 189 in the depth direction of the device.

The filter 189 is formed with a light transmitting material capable of allowing light to pass through, and transmits the light from the light diffusion member 188 or namely the light from the light sources 181 to 185 to outside the pattern light emission portion 180.

The filter 189 includes a first surface 189*a* and a second surface 189*b*. The first surface 189*a* and the second surface 189*b* are formed in respectively different angles in the up-down direction. Namely, the first surface 189*a* and the second surface 189*b* are formed so as to emit light from the light diffusion member 188 in different visible directions in up-down direction.

More specifically, the first surface 189*a* slopes inwards heading downwards and the second surface 189*b* slopes inwards heading upwards. In other words, among the surfaces on the front side of the filter 189, the lower side surface facing obliquely downwards is the first surface 189*a* and the upper side surface facing obliquely upwards is the second surface 189*b*.

Also, the second surface 189*b* is provided above the first surface 189*a*, and the upper end of the first surface 189*a* and the lower end of the second surface 189*b* are coupled. Namely, if viewed from a left-right direction, the filter 189 is formed in an approximate V-shaped cross-section to open towards the back side (rearwards). Visual recognition is good due to the light emitted from the first surface 189*a* when the person (user) is away from the image forming device 100. On the other hand, visual recognition is also good due to the light emitted from the second surface 189*b* since the operator (user) stands and operates the control panel 120 from the front side. The pattern light emission portion 180 can in this way function as a status display light for notifying the user of the status of the image forming device 100 and therefore improves the visual recognition.

Figure 10A:
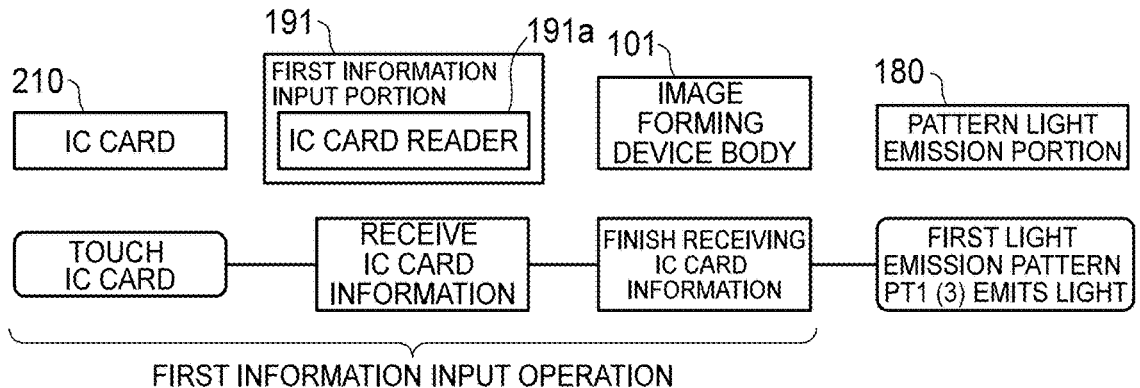
FIG. 10A is a descriptive drawing for describing the light emission start timing of the first light emission pattern corresponding to an information input operation for the first information input portion.
Figure 10B:
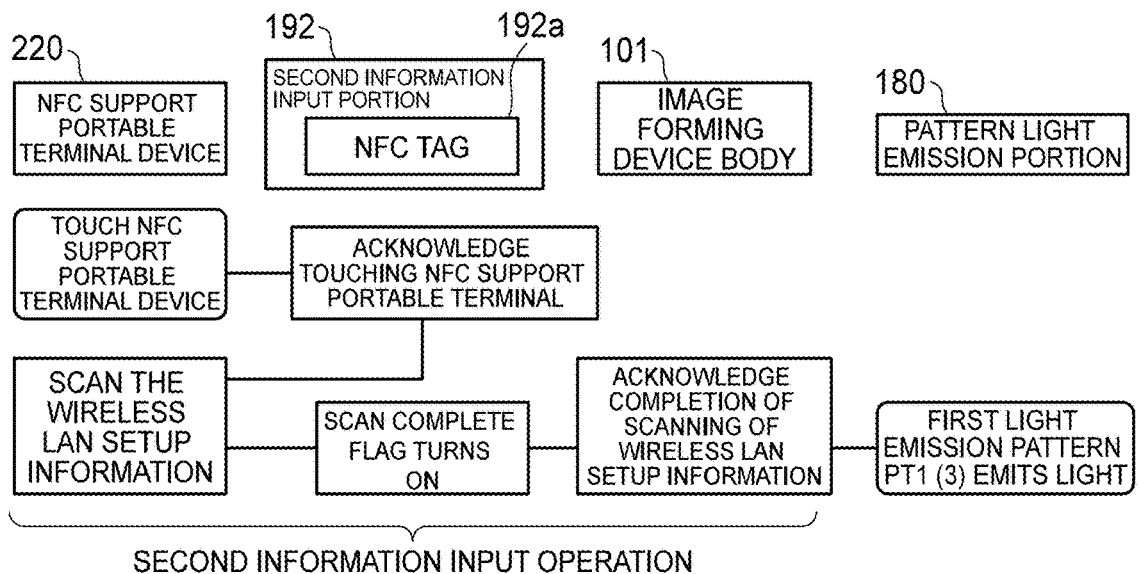
FIG. 10B is a descriptive drawing for describing the light emission start timing of the first light emission pattern corresponding to the information input operation for a second information input portion.
Figure 10C:
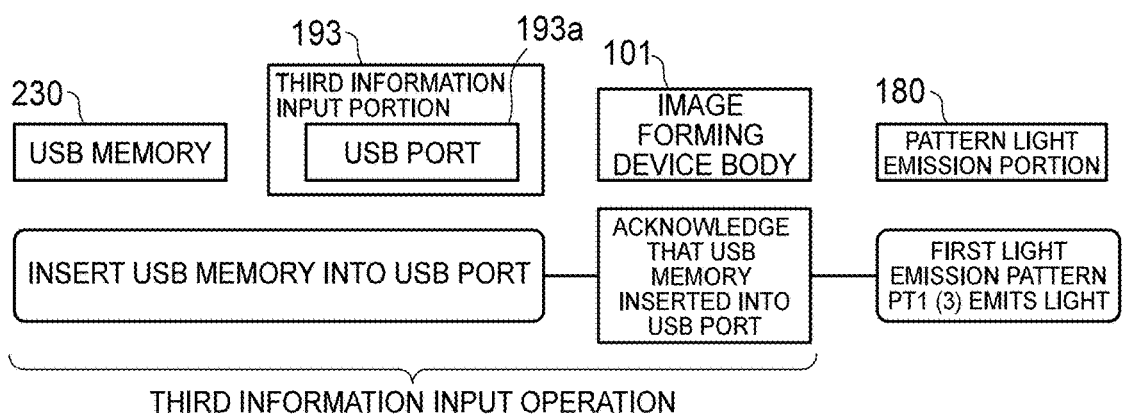
FIG. 10C is a descriptive drawing for describing the light emission start timing of the first light emission pattern corresponding to the information input operation for a third information input portion.
Figure 11:
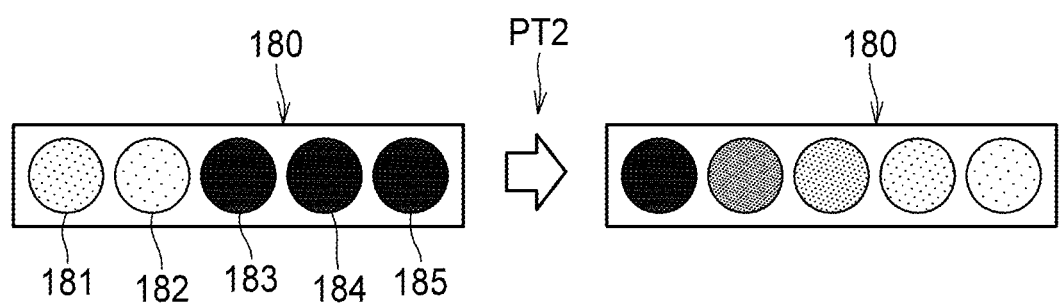
FIG. 11 is a schematic plan view of a pattern light emission portion showing an example of light emission of a second light emission pattern.

FIGS. 9A to 9D are plan views of the pattern light emission portion 180 that diagrammatically show an example of emission of the first light emission patterns PT1 (1) to PT1 (*n*) (n is an integer of 2 or more, in this example, n=4). FIGS. 10A to 10C are explanatory drawings for describing the light emission start timing of the first light emission pattern PT1 (3) respectively corresponding to the information input operation from the first information input portion 191 to the third information input portion 193. FIG. 11 is a plan view of the pattern light emission portion 180 that diagrammatically shows an example of emission of the second light emission pattern PT 2. One cycle of the first light emission patterns PT1 (1) to PT1 (*n*) and the second light emission pattern PT2 is a predetermined fixed amount of time (for example, approximately 2 seconds to 4 seconds). The lighting up of the light sources 181 to 185 is not instantaneous but rather the brightness gradually intensifies. Also, the extinguishing or turning off of the light sources 181 to 185 is not instantaneous rather the brightness gradually diminishes.

The light emission control portion 171*a* controls emission of the plurality of types of light emission patterns (the first light emission patterns PT1 (1) to PT1 (*n*)) (see FIGS. 9A to 9D) from the plurality of light sources 181 to 185. The light emission control portion 171*a* respectively emits the light emission pattern corresponding to the plurality of types of operation by the operator at the operating portion 103. In this way, the operation by the operator at the operating portion 103 can be visually expressed to the operator by emission of first light emission patterns PT1 (1) to PT1 (*n*). Also, the light emission control portion 171*a* emits the second light emission pattern (see FIG. 11) expressing the predetermined operation of the image forming device 100.

Also, the light emission control portion 171*a* differs the first light emission patterns PT1 (1) to PT1 (*n*) for each of the plural types of operations. In this way, the operator can definitely recognize the operation contents at the operating portion 103 for each of a plurality of types of operations.

In addition, the light emission control portion 171*a* varies the light emission pattern when the processing operation of the image forming device 100 is different (for example, when turning the power key 121*a* on and off) for the same operation (for example, operating the power key 121*a*). Varying the light emission pattern allows the operator to reliably recognize the contents of the operating process when the processing by the image forming device 100 is different even though the operation is the same.

Figure 9A:
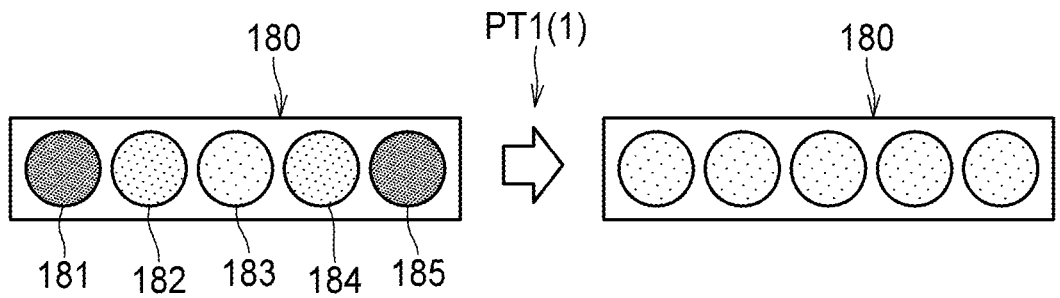
FIG. 9A is a schematic plan view of the pattern light emission portion showing an example of light emission of a first light emission pattern.

First light emission pattern shown in FIG. 9A In the first light emission pattern PT1 (1) shown in FIG. 9A, after the light sources 181 to 185 are randomly lit up, the light sources 181 to 185 are all turned on together at once and then turned off. This is one cycle of the first light emission pattern PT1 (1). The operation by the operator at the operating portion 103 is a turning-on operation of the power key 121*a* or a turning-on operation of the power-saver key 121*b* (restoring operation from energy saving mode) by the operator. The light emission start timing for the first light emission pattern PT1 (1) is the time point that the power key 121*a* or the power-saver key 121*b* is turned on. The first light emission pattern PT1 (1) emits light for only one cycle.

The first light emission pattern PT1 (1) may be set to emit light when results from the motion sensor 151 detect that a person is present. Needless to say, the turning-on operation of the power key 121*a* or the power-saver key 121*b* by the operator is a manual (turning) off operation and is not included during automatic (turning) on such during receiving of printing jobs and during auto shutoffs.

Figure 9B:
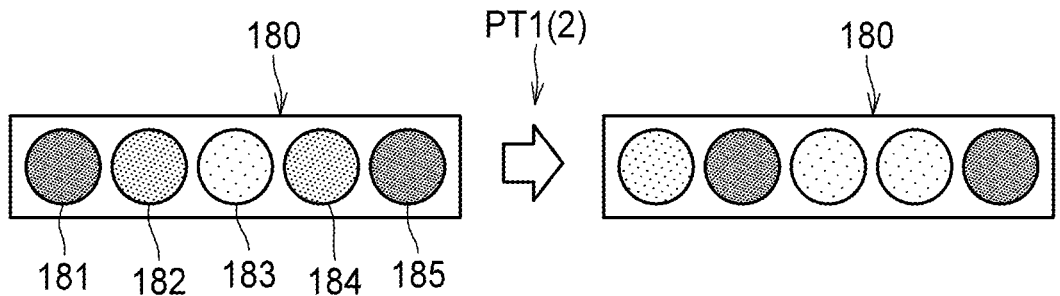
FIG. 9B is a schematic plan view of the pattern light emission portion showing another example of light emission of the first light emission pattern.

First Light Emission Pattern Shown in FIG. 9B

In the first light emission pattern PT1 (2) shown in FIG. 9B, the light sources 181 to 185 all light up together (different light intensities in order from the center) and afterwards randomly extinguish (turn off). This is one cycle of light emission by the first light emission pattern PT1 (2). The operation by the operator at the operating portion 103 is a turning-off operation of the power key 121*a* or turning-off operation of the power-saver key 121*b* (operation to shift to energy saving mode) by the operator. The light emission start timing for the first light emission pattern PT1 (2) is the time point that the power key 121*a* or the power-saver key 121b is turned off. The first light emission pattern PT1 (2) emits light for only one cycle.

Turning-off operation of the power key 121a by the operator is not linked to displaying a message on the display screen of the display device 122 during adjustment of the image quality. For example, in some cases the message, "Image quality adjustment is in progress. Please wait." might not appear on the display screen of the display device 122 even if the first light emission pattern PT1 (2) that is shown in FIG. 9B is emitting light.

Figure 9C:
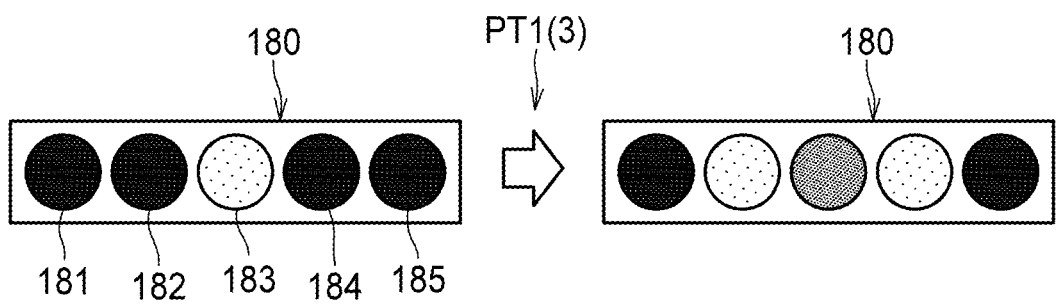
FIG. 9C is a schematic plan view of the pattern light emission portion showing yet another example of light emission of the first light emission pattern.

First Light Emission Pattern Shown in FIG. 9C

In the first light emission pattern PT1 (3) shown in FIG. 9C, after the light source 183 in the center amidst the light sources 181 to 185 lights up, the other light sources light up as the light sequentially widens in the left-right direction X towards the outer sides (in order from the light source 182 to the light source 181, in order from the light source 184 to the light source 185). The light sources 183, (182, 184), (181, 185) that first lit up, extinguish in order each time the subsequent light sources (182, 184), (181, 185) light up. This is one cycle of light emission of the first light emission pattern PT1 (3). The operation by the operator at the operating portion 103 is the information input operation for the information input portion 190. More specifically the information input operation for the information input portion 190 is: a first information input operation for the IC card 210 in the first information input portion 191 (IC card reader 191a), a second information input operation for the scan complete flag FL in the second information input portion 192 (NFC tag 192a), and a 3rd information input operation to the USB memory 230 in the third information input portion 193 (USB port 193a). The light emission start timing of the first light emission pattern PT1 (3) in the first information input operation (scanning operation in the IC card reader 191a) is the time point that information for the IC card 210 is received, and information for IC card 210 is completed (see FIG. 10A). The light emission start timing of the first light emission pattern PT1 (3) in the second information input operation (read operation with the NFC tag 192a) is the time point that the scan complete flag FL turns on, and recognition that the scanning of wireless LAN information is completed (see FIG. 10B). The light emission start timing for the first light emission pattern PT1 (3) in the third information input operation (scanning or reading operation in the USB port 193a) is the time point that the USB memory 230 is recognized as inserted in the USB port 193a (see FIG. 10O). The first light emission pattern PT1 (3) emits light only for one cycle.

Figure 9D:
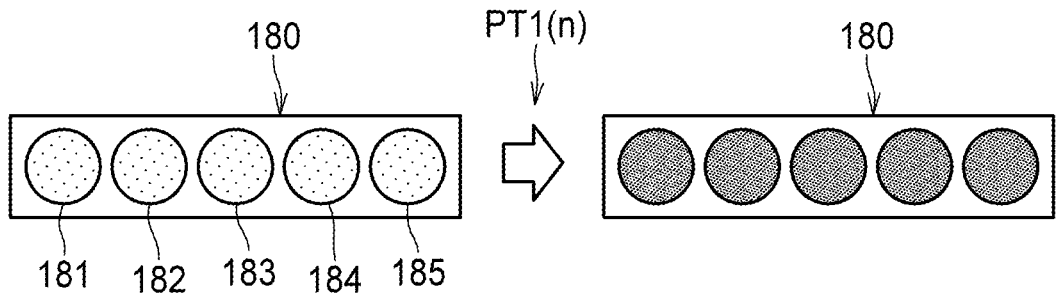
FIG. 9D is a schematic plan view of the pattern light emission portion showing yet another example of light emission of the first light emission pattern.

First Light Emission Pattern Shown in FIG. 9D

In the first light emission pattern PT1 (n) shown in FIG. 9D, the light sources 181 to 185 turn on all at once and then gradually turn off (extinguish) at the same timing. This is the light emission for one cycle of the first light emission pattern PT1 (n). The operation by the operator at the operating portion 103 is a turn-on operation for the key shown on the display screen of display device 122 by the operator. More specifically, the turn-on operation for the key includes the first to the third turn-on operations. The first turn-on operation is for the job run key 122a to command the start of the copy function, scanner function, and facsimile function from the control panel 120 by the operator. The second turn-on operation is turn-on operation for the job run key 122a during simultaneously executing a plurality of jobs by a one-time key operation. The third turn-on operation is turn-on operation for the job run key 122a by the operator while the image forming device 100 is linked with a cloud server when the image forming device 100 is set to the cloud environment.

Here, the first turn-on operation includes the key-on operation on various modes such as print image preview and large-volume document mode (mode that scans each document several times on the automatic text feeder 160 and copies or sends the text all together). The first turn-on operation also includes key-on operation by a user that receives, prints, saves, and transfers in functions for Internet facsimiles and facsimiles by telephone line.

The light emission start timing of the first light emission pattern PT1 (n) is the time point that the operator turns on the job run key 122a in the first turn-on operation; in the second turn-on operation, the time point that a plurality of jobs are simultaneously executed with one-time key operation; and in the third turn-on operation, the time point that the job run key 122a (for example, the job run key 122a for a printing job of data on a cloud server and the job run key 122a for the job of sending scan data to a cloud server) is turned on. The first light emission pattern PT1 (n) emits light for only one cycle.

Second Light Emission Pattern Shown in FIG. 11

In the second light emission pattern PT2 shown in FIG. 11, the light sources 181 to 185 start lighting up from the light source 181 at the left end, and then light up in order in a flow to the right side. Namely the light sources 181, 182, 183, and 184 that first light up, subsequently turn off (extinguish) in order, each time the subsequent light sources 182, 183, 184, and 185 light up, and finally the light source 185 on the right end turns off (extinguishes). This is light emission for one cycle of the second light emission pattern PT2. The predetermined operation for the image forming device 100 is an image forming operation that the image forming device 100 cannot appropriately perform or an image forming operation that itself cannot be performed. More specifically, a predetermined operation is an operation that automatically adjusts the quality of the image (image quality adjustment operation), an operation that automatically supplies toner to the developer device 2 (toner refill operation), and an operation until the fixing device 12 reaches the predetermined fixing temperature (warm-up operation). The light emission start timing of the second light emission pattern PT2 is the time point in the image quality adjustment that the image quality adjustment is performed (for example, auto color calibration, density correction), is the time point in toner refill operation that the toner refill starts, and is the time point in warm-up operation that the image forming device body 101 in the power-off state and returned from energy saving mode. The end start timing for the second light emission pattern PT2 is the time point in image quality adjustment that the image quality adjustment is completed, is the time point in toner refill operation that refill of toner is completed, and is the time point in warm-up operation that the warm-up is completed.

System Settings

The setting flag SFL (see FIG. 8) preset in the storage 172 can set whether or not to emit the first light emission pattern PT1 (1) to PT1 (n) and the second light emission pattern PT2. For example, when the setting flag SFL is turned on, the light emission control portion 171a emits the first light emission patterns PT1 (1) to PT1 (n) and the second light emission pattern PT2. On the other hand, when the setting flag SFL is turned off, the light emission control portion 171a does not perform emission of the first light emission pattern PT1 (1) to PT1 (n) and the second light emission pattern PT2.

During Simulation Mode

When the image forming device 100 is in simulation mode, the light emission control portion 171a does not emit light for other than the first light emission pattern PT1 (3) corresponding to the third information input operation (reading) operation in the USB port 193a).

Examples of Light Control Operation by the Light Emission Controller

Figure 12:
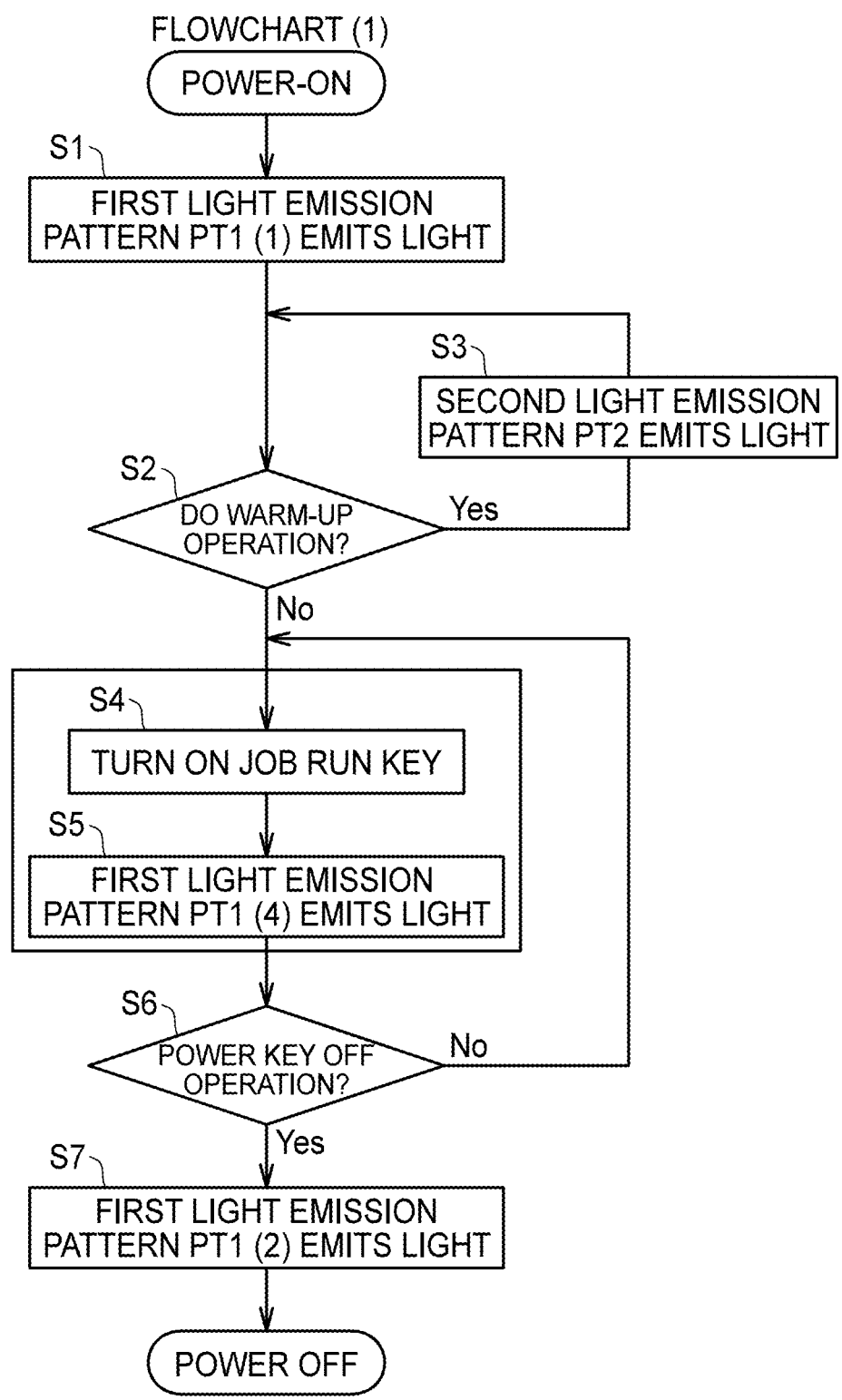
FIG. 12 is a flowchart (1) showing an example of the light emission control operation by the light emission controller.
Figure 13:
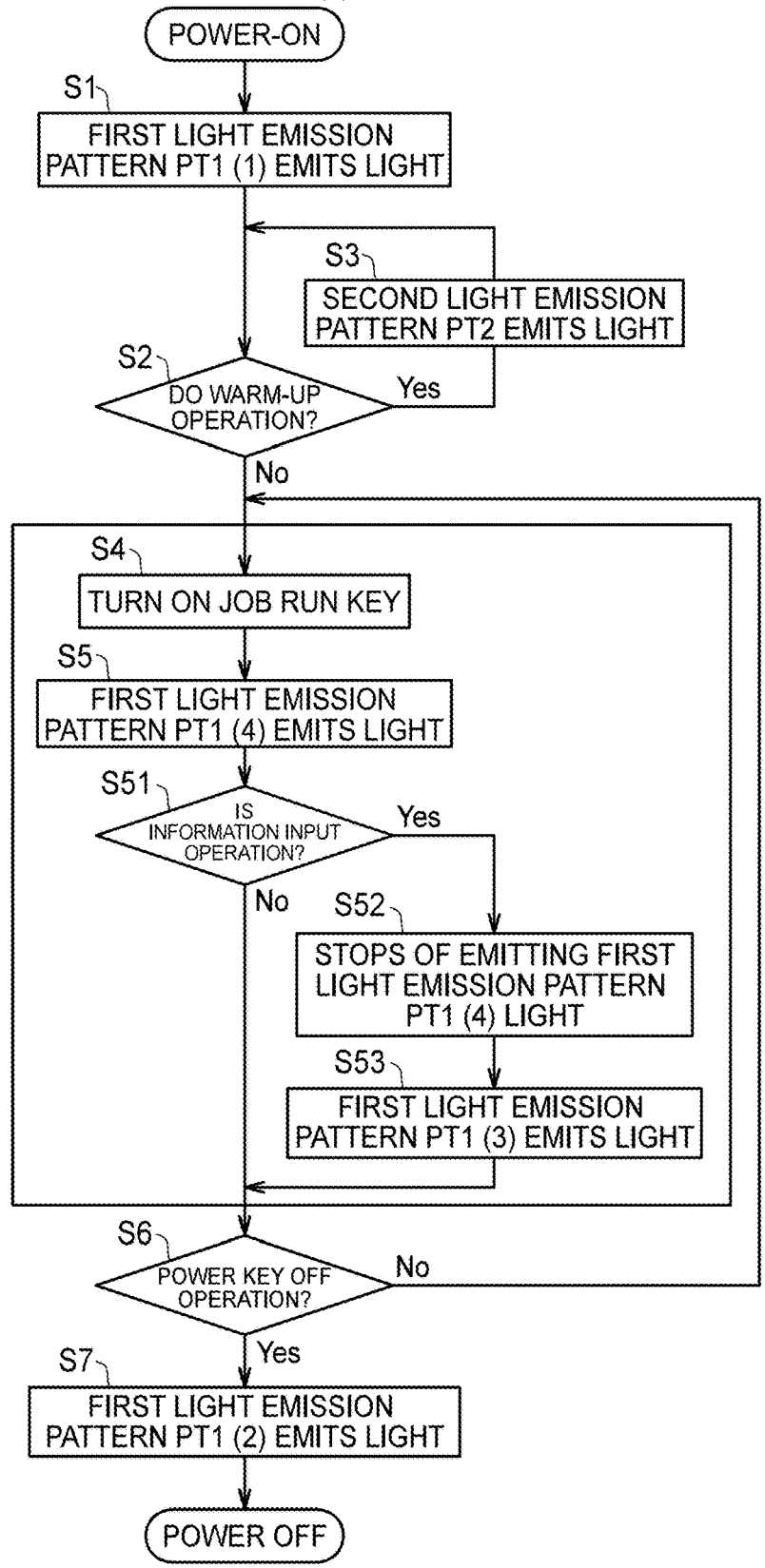
FIG. 13 is a flowchart (2) showing an example of the light emission control operation by the light emission controller.
Figure 14:
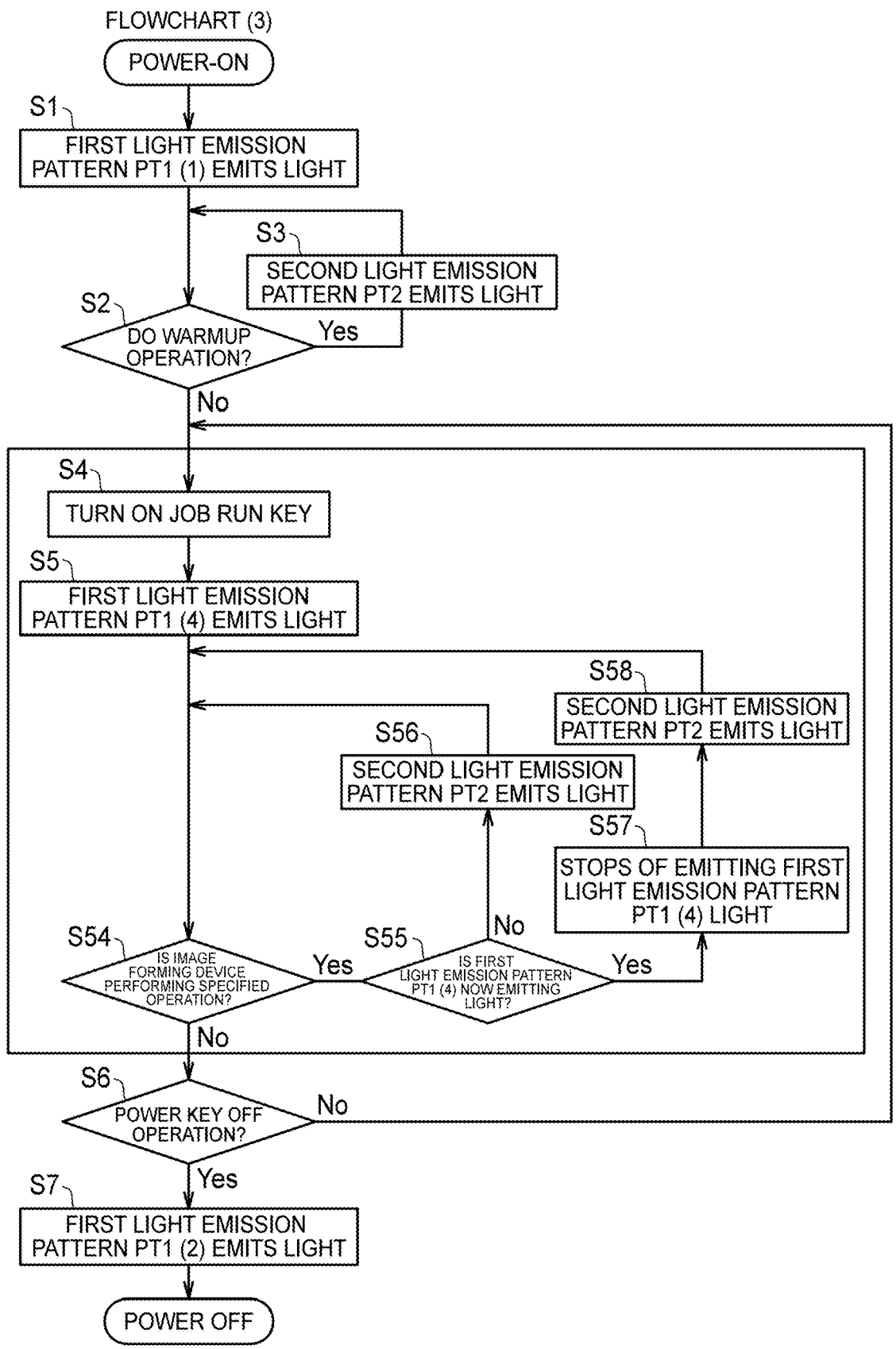
FIG. 14 is a flowchart (3) showing an example of the light emission control operation by the light emission controller.

The flowcharts (1) to (3) in FIGS. 12 to 14 show examples of light emission control operation by the light emission control portion 171a from turning on until turning off of the power key 121a.

Flowchart (1)

FIG. 12 is a flowchart (1) showing an example of the light emission control operation by the light emission control portion 171a.

In an example of light emission control operation shown in FIG. 12, first of all, the light emission control portion 171a emits the first light emission pattern PT1 (1) for one cycle (S1), and judges whether or not the image forming device 100 is in warm-up operation (S2). When the image forming device 100 is in warm-up operation (Yes in step S2), the light emission control portion 171a emits the second light emission pattern PT2 (S3) and the processing proceeds to S2. On the other hand, when the image forming device 100 is not in warm-up operation, the light emission control portion 171a proceeds the processing to step S3 (No in step S2).

Next, the light emission control portion 171a emits the first light emission pattern PT1 (4) for one cycle (S5) when the job run key 122a is turned on (S4) and judges whether or not the operator performs the turn-off operation to the power key 121a (S6).

Next, when the operator does not perform turn-off operation to the power key 121a (No in step S6), the processing with light emission control portion 171a proceeds to step S4. On the other hand, when the operator performs turn-on operation by the power key 121a (Yes in step S6), the light emission control portion 171a emits the first light emission pattern PT1 (2) for one cycle (S7).

Flowchart (2)

FIG. 13 is a flowchart (2) showing another example of the light emission control operation by the light emission control portion 171a.

The flowchart (2) shown in FIG. 13 differs from flowchart (1) shown in FIG. 12 in the point that the steps S51 to S53 have been added between S5 and S6. The following description focuses on S51 to S53.

In another example of light emission control operation shown in FIG. 13, after emitting the preceding light emission pattern PT1 (4) corresponding to the previous operation (S5), the light emission control portion 171a judges whether or not there is an information input operation (a reading operation in the IC card reader 191a, a scan (read) operation of the NFC tag 192a, a reading operation in the USB port 193a) to the information input portion 190 (851). When the judgment is that there is no information input operation (No in step S51), the processing with light emission control portion 171a proceeds to S6. On the other hand, when the light emission control portion 171a judges there is an information input operation (Yes in step S51), the light emission control portion 171a stops emission of the preceding light emission pattern PT1 (4) (852), and starts emission of the subsequent light emission pattern PT1 (3) corresponding to the subsequent operation for one cycle (S53). At the time point when emission of the subsequent light emission pattern P1 (3) starts (time point of issue of light emission trigger), the light emission control portion 171a stops emission of the preceding light emission pattern PT1 (4).

Flowchart (3)

FIG. 14 is a flowchart (3) showing yet another example of the light emission control operation by the light emission control portion 171a.

The flowchart (3) shown in FIG. 14 differs from flowchart (1) shown in FIG. 12 in the point that the steps S54 to S58 have been added between S5 and S6. The following description focuses on S54 to S58.

In yet another example of the light emission control operation shown in FIG. 14, after emitting the first light emission pattern PT1 (4) (S5), the light emission control portion 171a judges whether or not the image forming device 100 is in a predetermined operation (image quality adjustment operation, toner refill operation, and warm-up operation) (S54). When there is no predetermined operation (No in step S54), the processing with the light emission control portion 171a proceeds to S6. On the other hand, when there is a predetermined operation (Yes in step S54), the light emission control portion 171a judges whether or not the first light emission pattern PT1 (4) is currently emitting light (S55). When light emission of the first light emission pattern PT1 (4) is ended (No in step S55), the light emission control portion 171a emits the second light emission pattern PT2 (S56) until the predetermined operation of the image forming device 100 ends (No in step S54). When the first light emission pattern PT1 (4) is currently emitting light (Yes in step S55), the light emission control portion 171a stops emission of the first light emission pattern PT1 (4) (S57), emits the second light emission pattern PT2 (S58) until the image forming device 100 ends the predetermined operation (No in step S54, Yes in step S55), and stops emission of the first light emission pattern PT1 (4) even after the image forming device 100 has ended the predetermined operation.

First Embodiment

In the first embodiment, the light emission control portion 171a emits the respective light emission patterns [first light emission patterns PT1 (1) to PT1 (*n*)] corresponding to the plurality of types of operations by the operator at the operating portion 103. Emitting the first light emission patterns PT1 (1) to PT1 (*n*) in this way, allows visually expressing the operation by the operator at the operating portion 103 to the operator. Moreover, among the plurality of types of the first light emission patterns, when emission of the preceding light emission patterns PT1 (2) to PT(1(*n*) corresponding to the preceding operation overlaps with emission of the subsequent light emission patterns PT1 (2) to PT1 (*n*) corresponding to the operation subsequent to the preceding operation, the light emission control portion 171a preferentially emits the subsequent light emission patterns PT1 (2) to PT1 (*n*) that have a delay in the light emission start timing. The operator can in this way recognize that the subsequent operations at the operating portion 103 are accepted after accepting the preceding operations by the operator at the operating portion 103.

In the first embodiment, when the subsequent light emission patterns PT1 (2) to PT1 (*n*) have light emission priority, the light emission control portion 171a stops emission of the preceding light emission patterns PT1 (2) to PT (n). The light emission control portion 171a in this way avoids emitting light mixing the subsequent light emission patterns PT1 (2) to PT1 (*n*) with the preceding light emission patterns PT1 (1) to PT 1 (*n*).

However, when there is light emission of the preceding light emission pattern PT1 (2) to PT1 (n) even after emitting the subsequent light emission patterns PT1 (2) to PT1 (n), this situation might lead to mistakenly thinking that the operator performs a preceding operation at the operating portion 103 even more subsequent to (or namely after) the subsequent operation by the operator at the operating portion 103.

In this point, in the first embodiment, the light emission control portion 171a stops emission of the preceding light emission pattern PT1 (2) to PT1 (n) at the time point (time point that light emission trigger is issued) that emission of the subsequent light emission pattern PT1 (2) to PT1 (n) starts. By stopping light emission in this way, the light emission control portion 171a can prevent restoration of the preceding light emission pattern PT1 (2) to PT1 (n) at the time point that the subsequent light emission PT1 (2) to PT1 (n) starts. In this way, the misunderstanding that a preceding operation at the operating portion 103 is performed even more subsequent to (or namely after) the subsequent operation by the operator at the operating portion 103 can be prevented.

In the first embodiment, the plurality of types of operations include at least one from among a power-off operation for turning off power to the image forming device 100, an information input operation for inputting information (signal or data) to the image forming device 100, and job execution operation for executing jobs. In this way, when the light emission control portion 171a accepts a power-off operation or an information input operation during emitting the preceding light emission pattern PT1 (n) corresponding to a job execution operation, the light emission control portion 171a emits the subsequent light emission patterns PT1 (2) and PT1 (3) corresponding to the power-off operation or the information input operation prior to the preceding light emission pattern PT1 (n) corresponding to the job execution operation. Also, when the light emission control portion 171a accepts a power-off operation or a job execution operation during emitting the preceding light emission pattern PT1 (3) corresponding to the information input operation, the light emission control portion 171a emits the subsequent light emission patterns PT1 (2) and PT1 (n) corresponding to the power-off operation or the job execution operation prior to the preceding light emission pattern PT1 (3) corresponding to the information input operation. Also, when the light emission control portion 171a accepts a job execution operation or an information input operation during light emission of the preceding light emission pattern PT1 (2) corresponding to the power-off operation, the emission control portion 171a emits the subsequent light emission patterns PT1 (3) and PT1 (n) corresponding to the information input operation or the job execution operation prior to the preceding light emission pattern PT1 (2) corresponding to the power-off operation. For example, when the light emission control portion 171a accepts a power-off operation, the light emission control portion 171a can start the power-off operation after ending light emission of the first light emission pattern PT1 (2) corresponding to the power-off operation. In this case, the light emission control portion 171a can cancel the power-off operation when a job execution operation or an information input operation is accepted during emitting the first light emission pattern PT1 (2) corresponding to the power-off operation.

Second Embodiment

In the second embodiment, the light emission control portion 171a emits a respective plurality of first light emission patterns PT1 (1) to PT1 (n) corresponding to a plurality of types of operations by the operator at the operating portion 103. Emitting the first light emission patterns PT1 (1) to PT1 (n) in this way, allows visually expressing the operation by the operator at the operating portion 103 to the operator. However, the predetermined operations (for example, image adjustment operation, toner refill operation and warm-up operation) of the image forming device 100 are operations that make the operator wait, or namely are image forming operations that cannot be adequately performed or the image forming operation itself cannot be performed on the image forming device 100, so the first light emission patterns PT1 (2) to PT1 (n) should not be emitted. In regards to this point, the light emission control portion 171a emits a second light emission pattern PT2 expressing the predetermined operation. When any one type of the first light emission PT1 (i) (here, "i" is an integer between 2 to n) among the plurality of types of first light emission patterns PT1 (2) to PT1 (n) overlaps with emission of the second light emission pattern PT2, the light emission control portion 171a preferentially emits the second light emission pattern PT2. The operator can in this way recognize the predetermined operation after receiving the operation by the operator at the operating portion 103.

However, emission of the second light emission pattern PT2 expresses a predetermined operation to notify the operator of the image forming device 100 about the operation (for example, image quality adjustment operation, toner refill operation, and warm-up operation). So preferably, emission of the second light emission pattern PT2 continues while the predetermined operation is continuing.

In regard to this point, in the second embodiment, the light emission control portion 171a does not emit the first light emission patterns PT1 (2) to PT1 (n) while the second light emission pattern PT2 is being emitted (light emission trigger is cancelled). The light emission control portion 171a in this way prevents emission of the first light emission patterns PT1 (2) to PT1 (n) while the second light emission pattern PT2 is being emitted. Emission of the second light emission pattern PT2 can in this way continue when the predetermined operation is continuing.

In the second embodiment, during emission of the first light emission pattern PT1 (2) to PT1 (n), the light emission control portion 171a stops emission of the first light emission pattern PT1 (2) to PT1 (n), and preferentially emits the second light emission pattern PT2. The light emission control portion 171a in this way prevents emitting light mixing the second light emission pattern PT2 with the first light emission patterns PT1 (2) to PT1 (n).

However, when the first light emission pattern PT1 (2) to PT1 (n) is emitted even after emission of the second light emission pattern PT2, this situation might lead to mistakenly thinking that the operator performs an operation at the operating portion 103 after the completion of a predetermined operation.

In regard to this point, in the second embodiment, the light emission control portion 171a stops emission of the first light emission pattern PT1 (2) to PT1 (n) at the time point (time point that light emission trigger is issued) that emission of the second light emission pattern PT2 starts. By stopping light emission in this way, the light emission control portion 171a can prevent restoration of the first light emission pattern PT1 (2) to PT1 (n) at the time point that emission of the second light emission pattern PT2 starts. In this way, the misunderstanding that the operator performs an operation at the operating portion 103 after the completion of the predetermined operation.

Third Embodiment

In the third embodiment, the light emission control portion 171a respectively emits each of the first light emission patterns PT1 (1) to PT1 (n) corresponding to a plurality of types of operations by the operator at the operating portion 103. Emission of the first light emission patterns PT1 (1) to PT1 (n) can in this way visually express the operation by the operator at the operating portion 103 to the operator. Moreover, the light emission control portion 171a emits the second light emission pattern PT2 expressing the predetermined operation. The plurality of types of operations include power-on operation on the image forming device 100. The operator should preferably be able to recognize that warm-up is in progress even during a predetermined operation (for example, image quality adjustment operation, toner refill operation, and warm-up operation) during warm-up on the image forming device 100. In regard to this point, when emission of the first light emission pattern PT (1) among the plurality of types of first light emission patterns PT (1) to PT (n) corresponding to power-on operation overlaps with emission of the second light emission pattern PT2, the light emission control portion 171a preferentially emits the first light emission pattern PT (1) corresponding to the power-on operation. In this way, even if the image forming device 100 is for example performing a predetermined operation during warm-up, the first light emission pattern PT (1) can be emitted corresponding to the power-on operation so that the operator can recognize that warm-up is in progress.

During emitting the first light emitting pattern PT1 (1) corresponding to the power-on operation, the power-off operation, information input operation, and job execution operation are basically not accepted because the system is warming up. Therefore no overlap occurs between the first light emission pattern PT1 (1) corresponding to the power on operation and the first light emission patterns PT1 (2) to PT1 (n) corresponding to the power-off operation, information input operation or job execution operation.

In the third embodiment, the light emission control portion 171a stops emission of the second light emission pattern PT2, when light of the first light emission pattern PT1 (1) is preferentially emitted. The light emission control portion 171a can in this way be prevented from emitting light that is mixed light from first light emission pattern PT1 (1) and the second light emission pattern PT2.

However, when a predetermined operation (for example, image adjustment operation, toner refill operation, and warm-up operation) is continuing even after emission of the first light emission pattern PT1 (1) corresponding to the power-on operation, the operator preferably recognizes that the image forming device 100 is performing a predetermined operation.

In regard to this point, in the third embodiment, the light emission control portion 171a resumes emission of the second light emission pattern PT2 while a predetermined operation is continuing at the time point that emission of the first light emission pattern PT1 (1) corresponding to the power-on operation ends (time point when the light emission trigger is canceled). In this way, the operator can recognize that the image forming device 100 is performing a predetermined operation when the image forming device 100 is continuing a predetermined operation at the time point that emission of the first light emission pattern PT1 (1) corresponding to the power-on operation ends.

Fourth Embodiment

In the fourth embodiment, the light emission control portion 171a respectively emits each of the first light emission patterns PT1 (1) to PT1 (n) corresponding to a plurality of types of operations by the operator at the operating portion 103. Emission of the first light emission patterns PT1 (1) to PT1 (n) can in this way visually express the operation by the operator at the operating portion 103 to the operator. However, among the plurality of types of operations by the operator at the operating portion 103, there are the first light emission pattern PT1 (3) corresponding to operation that must emit light immediately after specific conditions are satisfied after an operation (for example, information input operation to enter information to the image forming device 100), and the first light emission patterns PT1 (1), PT1 (2), and PT1 (n) corresponding to operations that may emit light even immediately after an operation (for example, key input operation for key entry on the image forming device). Therefore, the plurality of types of first light emission patterns PT1 (1) to PT1 (n) are preferably set to an optimal light emitting start timing corresponding to the respective plurality of types of operations. In regard to this point, the light emission control portion 171a sets respectively different light emission start timings for the plurality of types of first light emission patterns PT1 to PT1 (n) according to the content of the respective operation. For example, a first light emission pattern PT1 (3) corresponding to the operation that must emit light immediately after specific conditions are satisfied is emitted after satisfying specific conditions after an operation. On the other hand, the first light emission patterns PT1 (1), PT1 (2), and PT1 (n) corresponding to the operation that may emit light immediately after an operation. The plurality of types of first light emission patterns PT1 (1) to PT1 (n) can in this way be emitted at an optimal light emission start timing according to the respective plurality of types of operations.

In the fourth embodiment, the plurality of types of operations include an information input operation for entering information into the image forming device 100. Among the plurality of types of first light emission patterns PT1 (1) to PT1 (n), the light emission start timing for the first light emission pattern PT1 (3) corresponding to the information input operation is when the input of information (signal or data) by information input operation is completed. A first light emission pattern PT1 (3) can in this way be emitted after specific conditions are satisfied (when input of information (signal or data) by the information input operation is completed), after key input operation for making key entries to the image forming device 100.

In the present embodiment, the plurality of types of operations include a key input operation for entering information into the image forming device 100. Among the plurality of types of first light emission patterns PT1 (1) to PT1 (n), the light emission start timing for the first light emission patterns PT1(1), PT1 (2), and PT1 (n) corresponding to the key input operation is the time point that the key input operation is accepted. The first light emission patterns PT1 (1), PT1 (2), and PT1 (n) can in this way be emitted immediately after the operation (when key input is accepted).

Fifth Embodiment

In the fifth embodiment, the light emission control portion 171a respectively emits each of the first light emission patterns PT1 (1) to PT1 (n) corresponding to a plurality of types of operations on the operating portion 103 by the operator. Emission of the first light emission patterns PT1 (1) to PT1 (n) can in this way visually express the operation by the operator at the operating portion 103 to the operator.

Moreover, the light emission control portion 171a emits the second light emission pattern PT2 corresponding to a predetermined operation (for example, image quality adjustment operation, toner refill operation, and warm-up operation). However, emission of the first light emission patterns PT1 (1) to PT1 (n) express operations by the operator at the operating portion 103 (for example, a power-off operation for turning off the power of the image forming device 100, an information input operation for inputting information to the image forming device 100, and a job execution operation for executing a job) and therefore need only inform the operator about the operation details within a short time (predetermined specific time (for example one cycle portion)). On the other hand, emission of the second light emission pattern PT2 expresses the predetermined operations of the image forming device 100 (for example, image quality adjustment operation, toner refill operation, and warm-up operation) so when the predetermined operation continues, the second light emission pattern PT2 preferably also continues to emit light. In regard to this point, the light emission end timing of the first light emission pattern PT1 (1) to PT1 (n) and the light emission end timing of the second light emission pattern PT2 are set different from one another. For example, when the operator performs the operation to the operating portion 103, the first light emission patterns PT1 (1) to PT1 (n) emits light only for a specific predetermined time to notify the operator about the contents of the operation. During a predetermined operation on the other hand, the second light emission pattern PT2 continues light emission until the predetermined operation is completed. The operator can in this way be informed of details of the operation information in a short time. Moreover, when a predetermined operation continues, emission of the second light emission pattern PT2 also continues.

In the fifth embodiment, the light emission end timing of the first light emission patterns PT1 (1) to PT1 (n) is when one cycle of the first light emission pattern PT1 (1) to PT1 (n) is completed. The operator can in this way definitely be notified of the contents of the operation in a short time.

In the fifth embodiment, the light emission end timing of the second light emission pattern PT2 is when the predetermined operation is completed. In this way, emission of the second light emission pattern PT2 can definitely continue while the predetermined operation is continuing.

In the fifth embodiment, the plurality of types of operations include a key input operation for key inputs to the image forming device 100. The predetermined operation includes at least one from among a toner refill operation and a warm-up operation. In this way, the first light emission patterns PT1 (1) to PT1 (n) are emitted for only a predetermined fixed time to notify the operator about the contents of the operation. On the other hand, in at least one operation from the toner refill operation and the warm-up operation, the second light emission pattern PT2 corresponding to at least one from among the toner refill operation and the warm-up operation, continues to emit light until one operation from the toner refill operation and the warm-up operation is completed. In this way, the operator can be informed of the details of the key input operation in a short time. Moreover, when at least one operation from the toner refill operation and the warm-up operation is continuing, the light emission from the second light emission pattern PT2 can also continue.

Other Embodiments

In the present embodiments, the job run key 122a is a software key however a hardware key may also be installed in the operating portion 103. In that case, pressing down the hardware key as the job run key can display a light emission pattern. Also, in the present embodiments there are five light sources however there may be two to four, or six or more light sources. There are also five types of first light emission patterns PT1 however there may be from two types to four types or six or more types. Also, the emission control portion 171a can perform the aforementioned light emission operation at the time of any of the copier function, scanner function, facsimile function, and printer function.

The present invention is not limited to the above described embodiments and may be achieved through various forms. The related embodiments are therefore nothing more than examples of various points and should not be interpreted as limiting the invention. The scope of the present invention is shown by the aspects of the invention and do not represent any type of restriction on the specifications. Moreover, all manner of changes and modifications belonging to the uniform range of the aspects of the invention are within the scope of the present invention.

DESCRIPTION OF REFERENCE NUMERALS 100 image forming device
101 image forming device body
103 operating portion
110 image forming portion
120 operating device
121 various keys
121a power key
121b power-saver key
122 display device
122a job run key
150 support portion
151 motion sensor
170 controller
171 processor
171a light emission control portion
172 storage
180 pattern light emission portion
181 to 185 light sources
190 information input portion
191 first information input portion
191a IC card reader
192 second information input portion
192a NFC tag
193 third information input portion
193a USB port
210 IC card
220 NFC portable terminal
220a NFC tag reader
230 USB memory
FL scan complete flag
PT1 first light emission pattern
PT2 second light emission pattern
SFL setting flag

What is claimed is:

1. An image forming device comprising:
   operation keys operated by a operator;
   a pattern light emission portion including a plurality of light sources; and
   a light emission controller that controls light emission of a plurality of types of light emission patterns from the pattern light emission portion, wherein
   the pattern light emission portion notifies the operator of information on operations of the operation keys, the light emission controller emits respective light emission patterns corresponding to a plurality of types of operations by the operator on the operation keys, the respective light emission patterns include respective series of light emission patterns from turn-on to turn-off of the plurality of light sources, and when emission of a preceding light emission pattern corresponding to a preceding operation of one of the operation keys among the plurality of types of light emission patterns temporally overlaps with emission of a subsequent light emission pattern corresponding to an operation of another one of the operation keys subsequent to the preceding operation, the light emission controller stops the emission of the preceding light emission pattern corresponding to the preceding operation of the one of the operation keys before the turn-off of the emission of the preceding light emission pattern, and preferentially emits the subsequent light emission pattern having a delayed light emission start timing.

2. The image forming device according to claim 1, wherein, the plurality of types of operations include at least one from among a power-off operation that turns off the image forming device, an information input operation that inputs information to the image forming device, and a job execution operation that executes a job.

3. An image forming device comprising:

operation keys operated by an operator;

a pattern light emission portion including a plurality of light sources; and a light emission controller that controls emission of a plurality of types of light emission patterns from the pattern light emission portion, wherein the pattern light emission portion notifies the operator of information on operations of the operation keys, the light emission controller respectively emits first light emission patterns corresponding to a plurality of types of operations by the operator on the operation keys, and further emits a second light emission pattern expressing a predetermined operation of the image forming device, the first light emission patterns and the second light emission pattern include respective series of light emission patterns from turn-on to turn-off of the plurality of light sources, and when emission of any type of first light emission pattern among the plurality of first light emission patterns temporally overlaps with emission of the second light emission pattern, the light emission controller stops the emission of the first light emission pattern before the turn-off of the emission of the first light emission pattern, and preferentially emits the second light emission pattern.

4. The image forming device according to claim 3, wherein, the light emission controller stops emission of the first light emission pattern at the time point that emission of the second light emission pattern starts.

5. The image forming device according to claim 3, wherein, the plurality of types of operations include a power-on operation for the image forming device, and the light emission controller preferentially emits light of a first light emission pattern corresponding to the power-on operation among the plurality of types of first light emission patterns when emission of the first light emission pattern corresponding to the power-on operation temporally overlaps with emission of the second light emission pattern.

6. The image forming device according to claim 5, wherein, the light emission controller stops emission of the second light emission pattern when the first light emission pattern corresponding to the power-on operation is preferentially emitted.

7. The image forming device according to claim 6, wherein, the light emission controller resumes emission of the second light emission pattern when the predetermined operation is continuing at the time point that emission of the first light emission pattern corresponding to the power-on operation ends.

* * * * *